Oct. 25, 1932.  W. V. LEWIS  1,884,001
SHEARING AND CUTTING MACHINE
Filed May 22, 1930   2 Sheets-Sheet 2

WITNESSES
INVENTOR
Walter V. Lewis
BY
ATTORNEYS

Patented Oct. 25, 1932

1,884,001

UNITED STATES PATENT OFFICE

WALTER V. LEWIS, OF SCOTIA, NEW YORK

SHEARING AND CUTTING MACHINE

Application filed May 22, 1930. Serial No. 454,779.

The invention comprehends a shearing and cutting machine with which may be cut all kinds and shapes of structural steel without distorting the structural steel at either side of the cut.

The invention further comprehends a machine of the class described which may be used to cut angle members, flat members and channel members by disposing them in position between movable heads which serve to clamp the member to be operated on by the cutting blade.

The invention further comprehends a machine of the class described having removable dies which may be used to support an I-beam, or other irregular member, between the clamping heads, it being possible to remove quickly the removable dies, or substitute another set of removable dies, as occasion may require.

The invention furthermore comprehends a machine of the class described in which the removable heads serve not only to clamp the member to be cut, but which also serve to square the member relatively to the cutting blade which insures a perfect cut.

The invention furthermore comprehends a machine of the class described which is provided with movable clamping heads having cutting blades, spaced apart and disposed in alignment with the principal cutting blades, a movable cutting blade being positioned to pass between the cutting blades on the clamping heads and also the principal cutting blades.

Additional objects of the invention will appear in the following specification in which the preferred form of the invention is described.

Figure 1:
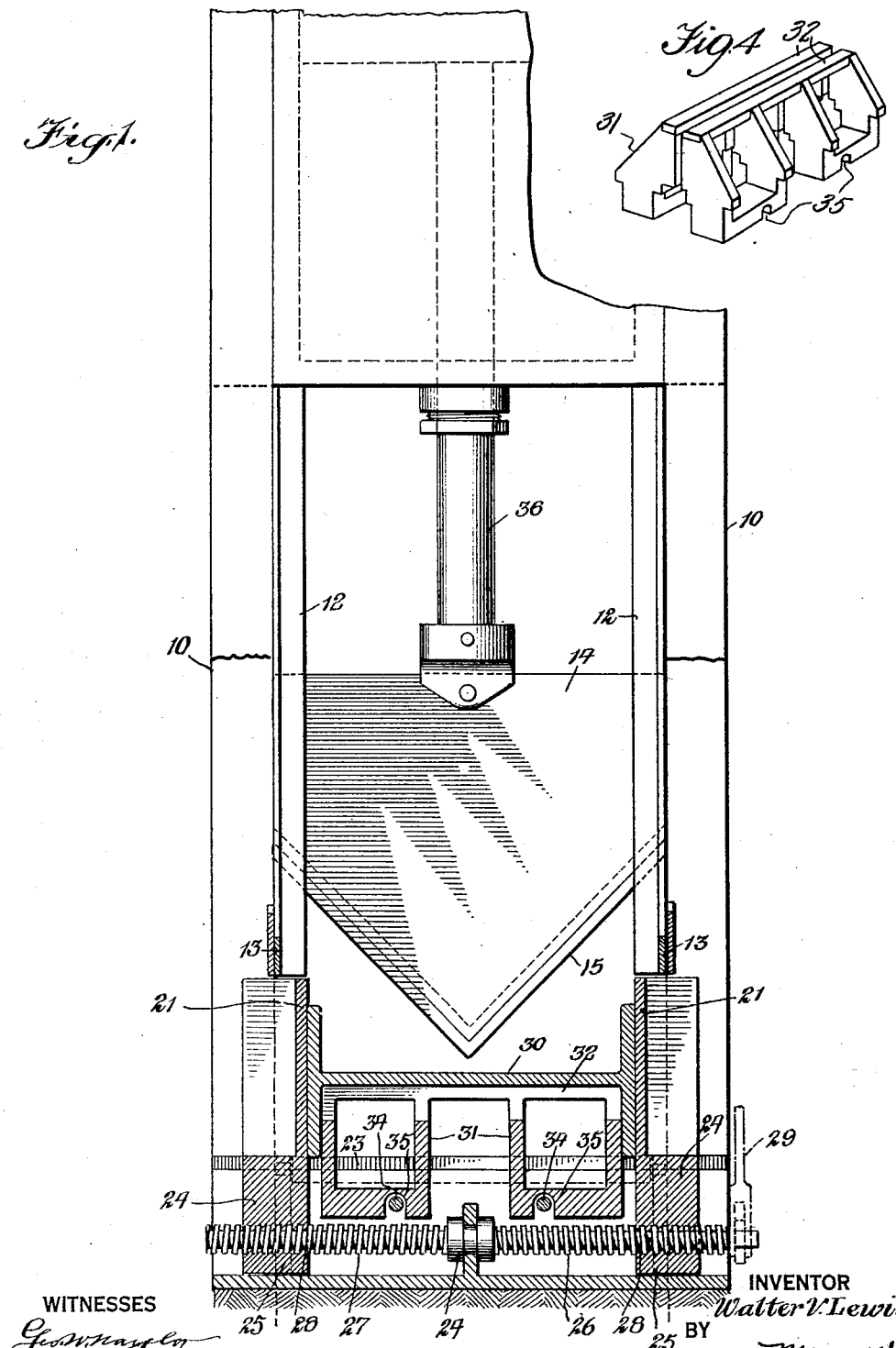
Figure 2:
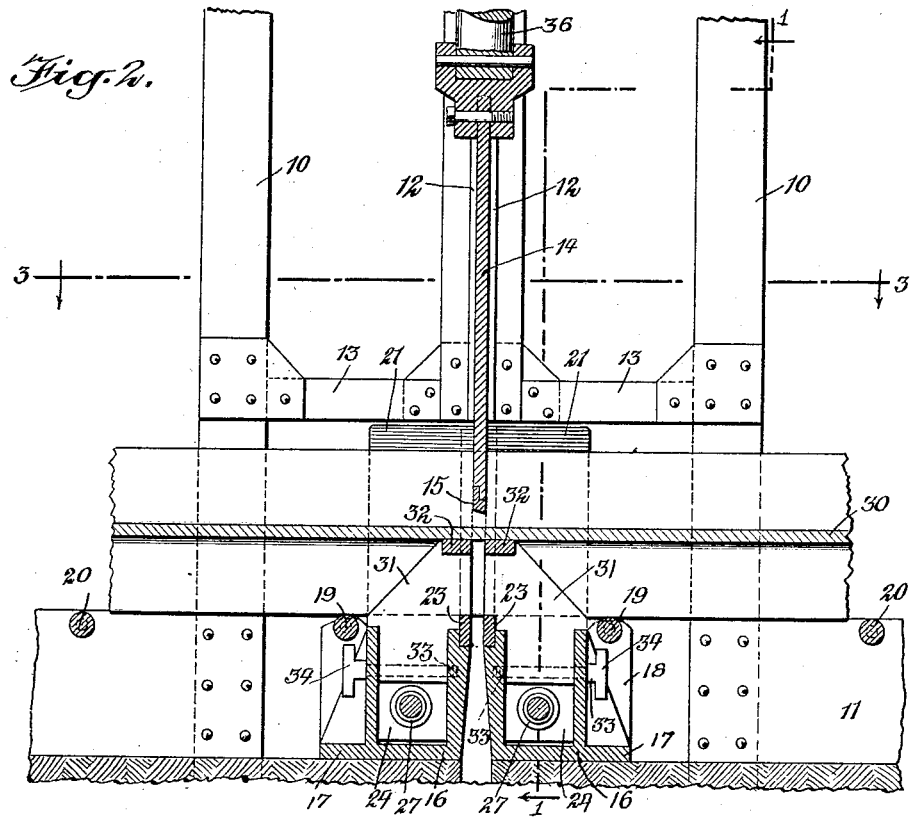
Figure 3:
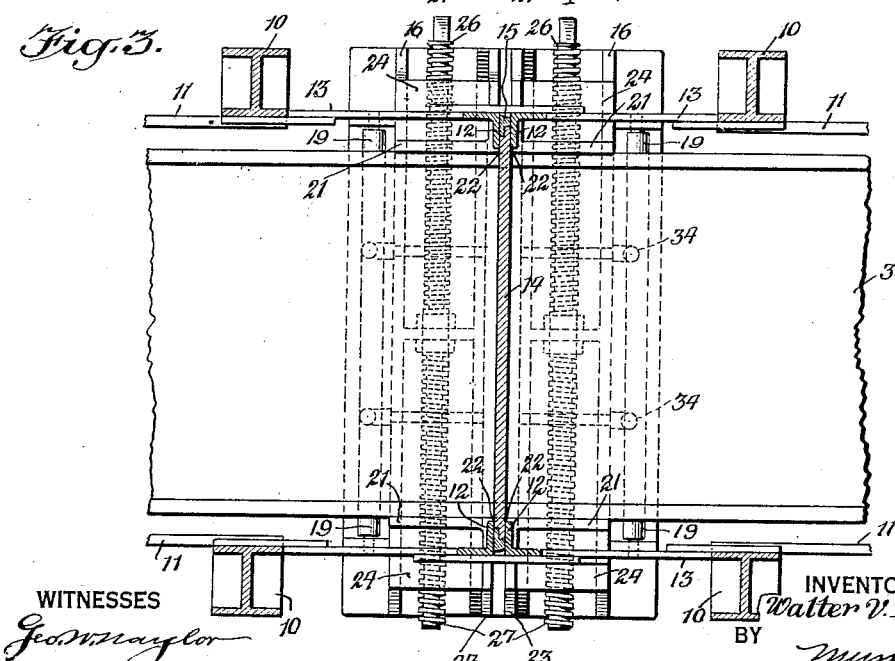

In the drawings similar reference characters refer to similar parts in all the views, of which Figure 1 is a sectional view on the line 1—1 of Figure 2, Figure 2 is a sectional elevation showing features of the construction, Figure 3 is a sectional view on the line 3—3 of Figure 2, and Figure 4 is a perspective view illustrating the detachable dies.

By referring to the drawings it will be seen that vertical frame members 10 are provided which are preferably I-beams, as illustrated in Figure 3 of the drawings, and riveted to these vertical frame members 10 there are longitudinal frame members 11. There are also guide members 12 for a movable cutting blade, which are supported by frame members 13 secured to the vertical frame members 10. Disposed for moving in the guide members 12 there is a cutting blade 14 having a cutting edge 15.

Disposed transversely there are two U-shaped guide members 16 having extensions 17 with vertically extending portions 18, there being rollers 19 journaled in these vertically extending portions 18. There are also additional rollers 20 journaled in the member 11, these rollers 19 and 20 serving to permit the ready adjustment of the member which is to be cut by the machine.

At each side of the machine there is a pair of clamping heads 21, each pair of clamping heads 21 being spaced apart to permit the cutting blade 14 to pass therebetween, the clamping heads 21 having cutting blades 22 which, with the movable cutting blade 14, will serve to cut without distortion any part of the structural member which is disposed at the clamping heads. The structural member at the cutting blades 22 will be cut by the cutting blade 14 and the cut thereby made will be clean without distortion of the structural member which is cut. Supported on the U-shaped guide members 16 there are also cutting blades 23, these cutting blades 23 being substantially in alignment with the cutting blades 22 so that with the movement of the movable cutting blade 14 this cutting blade 14 will pass not only between the cutting blades 22, but also between the cutting blades 23, as will be readily understood. The lower portions 25 of the clamping heads 21 are disposed in the U-shaped guide members 16, the clamping heads 21 preferably having cut-out portions fitting the top portions of the U-shaped guide members 16, and also the cutting blades 23, so that the clamping heads 21 may be moved to or from each other on the U-shaped guide members 16 and with their cutting blades 22 always in alignment with the cutting blades 23.

As will be seen by referring to the drawings, two screws are provided, each of these screws being journaled against longitudinal movement at a bearing 24 and having threads 26 and 27 at each end, one set of these threads being right hand threads and the other set of threads being left hand threads. These threads 26 and 27 mesh in threaded openings 28 in the portions 25 of the clamping heads 21 which are disposed in the U-shaped guide members 16, and it will be readily understood that with the rotation of the screws in one direction they will serve to draw the clamping heads 21 toward the center of the machine, while with a reverse movement of the screws they will serve to move the clamping heads 21 away from the central portion of the machine and towards the sides of the machine. Any suitable means may be provided for rotating the screws. In Figure 1 of the drawings there is indicated a lever 29 with a pawl and ratchet mechanism for rotating the screws, but it will, of course, be understood that the screws may be rotated by power, or in fact, any means which may be desired.

In the drawings there is shown an I-beam 30 in position to be cut by the machine. When such a structural member is to be cut it is best to use dies 31 with auxiliary cutting blades 32, the dies 31 serving to support the web of the I-beam with the cutting blades 32 at the said web. Dies of any desired shape and construction may be employed, depending on the size and character of the member which is to be cut. The dies 31 are supported by the cutting blades 23 and the upper portions of the U-shaped guide member 16. Preferably there are orifices 33 in the vertically extending portions of the U-shaped guide member 16, through which pins 34 may be disposed for moving in openings 35 in the dies 31 to hold the dies in position.

The movable cutting blade 14 is preferably operated by a hydraulic ram, the connection being shown at 36, but it will, of course, be understood that this movable cutting blade 14 may be operated by any desired means. When the structural member to be cut is moved into the machine, preferably on the rollers 19 and 20, and is in a general way in position, with or without the dies 31, the screws are turned to move the clamping heads 21 in the direction of each other, which will engage the sides of the structural member 30 to square the same with reference to the cutting blades and which will also serve to clamp the structural member securely in position. The cutting blade 14 is then operated and this cutting blade will pass between the cutting blades 22 on the clamping heads 21 and will sever the structural member at the cutting blades 22 and also at the cutting blades 23, or if the dies are used also at the cutting blades 32 and without distortion.

It will be seen that the cutting edge 15 is at an angle with the cutting point, and that the cutting edge 15 acts in a general way as a punch and gives smooth and clean edges at the cut. Waste material made by the cutting blades will fall between the U-shaped guide members 16.

What is claimed is:

1. In a shearing and cutting machine, supports having cutting blades spaced apart, two pairs of clamping heads disposed for moving on the supports, each pair of clamping heads being spaced apart and the clamping heads having cutting blades disposed substantially in alignment with the first mentioned cutting blades, a movable cutting blade positioned for movement between the first mentioned cutting blades and also between the second mentioned cutting blades, two screws journaled in bearings, each screw having a right hand thread at one end and a left hand thread at its other end, the clamping heads having threaded openings, the threads at one set of ends of the screws meshing in the threaded openings in one set of clamping heads, and the threads at the other ends of the screws meshing in the threaded openings in the other pair of clamping heads.

2. In a shearing and cutting machine, guides for clamping heads and having cutting blades spaced apart, clamping heads movable in the guides and on the cutting blades, the clamping heads having cutting blades substantially in alignment with the first mentioned cutting blades, guides for a movable cutting blade, and a movable cutting blade disposed in the last mentioned guides and positioned for movement between the first and second mentioned cutting blades respectively, and removable dies having cutting blades normally disposed on the first mentioned guides and on the first mentioned cutting blades.

3. In a shearing and cutting machine, two pairs of clamping members, each pair of clamping members being spaced apart, cutting blades, a movable cutting blade adapted to pass between the clamping members and between the cutting blades, two screws journaled in bearings, each screw having a right hand thread at one end and a left hand thread at its other end, the clamping members having threaded openings, the threads at one set of ends of the screws meshing in the threaded openings in one set of clamping members, and the threads at the other ends of the screws meshing in the threaded openings in the other pair of clamping members.

4. In a shearing and cutting machine, two channel guide members, cutting blades spaced apart, and supported by the channel guide members side cutting blades, disposed for traveling on the first mentioned cutting blades, means supporting the side cutting blades having portions for traveling in the channel guide members, means in the channel guide members for moving the first mentioned means relatively to the channel guide members, and a movable cutting blade for passage between the first mentioned cutting blades.

5. In a shearing and cutting machine, two parallel channel guide members, cutting blades spaced apart and supported by adjacent sides of the channel guide members, clamping heads mounted for traveling on the cutting blades, the clamping heads having cutting blades in alignment with the first mentioned cutting blades and portions disposed in the channel guide members, means in the channel guide members for moving the clamping heads to clamp therebetween a member to be cut, and a movable cutting blade for passage between the first and second mentioned cutting blades.

6. In a shearing and cutting machine, two parallel channel guide members, cutting blades spaced apart and supported by the channel guide members, clamping heads mounted for traveling on the cutting blades, the clamping heads having cutting blades in alignment with the first mentioned cutting blades and portions disposed in the channel guide members, means in the channel guide members for moving the clamping heads to clamp therebetween a member to be cut, a movable cutting blade for passage between the first and second mentioned cutting blades, and removable dies for supporting the member to be cut normally resting on the channel guide members and the first mentioned cutting blades.

7. In a shearing and cutting machine, two channel guide members, cutting blades spaced apart and supported by the channel guide members, clamping heads mounted for traveling on the cutting blades, the clamping heads having cutting blades in alignment with the first mentioned cutting blades and portions disposed in the channel guide members, means in the channel guide members for moving the clamping heads to clamp therebetween a member to be cut, a movable cutting blade for passage between the first and second mentioned cutting blades, removable dies for supporting the member to be cut normally resting on the channel guide members and the first mentioned cutting blades, and supports for the die members extending across the channel guide members respectively.

8. A shearing and cutting machine in which a single movable cutter cooperates with a pair of dies for cutting a web of a girder or the like, and adjustable pairs of dies co-terminous with the web dies for cutting flanges, the web dies being carried on guide members which also serve to support adjustable clamping heads carrying the flange dies, said guide members being further adapted to hold and support removable frame members carrying a further pair of cutting dies for alternative use in cutting a web located at a higher level than the bottom edges of the flanges.

WALTER V. LEWIS.